United States Patent
McCorkendale et al.

(10) Patent No.: US 9,888,377 B1
(45) Date of Patent: Feb. 6, 2018

(54) USING PERSONAL COMPUTING DEVICE ANALYTICS AS A KNOWLEDGE BASED AUTHENTICATION SOURCE

(71) Applicant: Symantec Corporation, Mountain View, CA (US)

(72) Inventors: Bruce McCorkendale, Manhattan Beach, CA (US); Ilya Sokolov, Boston, MA (US); Kevin Jiang, San Mateo, CA (US)

(73) Assignee: Symantec Corporation, Mountain View, CA (US)

( * ) Notice: Subject to any disclaimer, the term of this patent is extended or adjusted under 35 U.S.C. 154(b) by 128 days.

(21) Appl. No.: 15/164,620

(22) Filed: May 25, 2016

(51) Int. Cl.
| | |
|---|---|
| *H04L 29/06* | (2006.01) |
| *G06F 17/30* | (2006.01) |
| *G06F 15/16* | (2006.01) |
| *G06F 7/04* | (2006.01) |
| *H04W 12/04* | (2009.01) |
| *H04W 12/06* | (2009.01) |
| *H04W 12/08* | (2009.01) |

(52) U.S. Cl.
CPC ............ *H04W 12/04* (2013.01); *H04L 63/06* (2013.01); *H04L 63/0853* (2013.01); *H04L 63/107* (2013.01); *H04W 12/06* (2013.01); *H04W 12/08* (2013.01); *H04L 2463/082* (2013.01)

(58) Field of Classification Search
CPC ..... H04W 12/04; H04W 12/06; H04W 12/08; H04L 63/06; H04L 63/0853; H04L 63/107; H04L 2463/082
USPC .......................................................... 726/6
See application file for complete search history.

(56) References Cited

U.S. PATENT DOCUMENTS

| | | | | |
|---|---|---|---|---|
| 6,263,447 | B1* | 7/2001 | French | G06F 21/31 380/30 |
| 6,735,701 | B1* | 5/2004 | Jacobson | H04L 29/06 726/1 |
| 8,850,537 | B1* | 9/2014 | Dotan | H04L 63/08 726/6 |
| 9,043,887 | B2* | 5/2015 | McLachlan | H04L 63/08 705/2 |
| 9,083,527 | B1 | 7/2015 | McCorkendale et al. | |
| 9,565,562 | B1* | 2/2017 | Bar-Menachem | H04W 12/06 |
| 2004/0162981 | A1* | 8/2004 | Wong | H04L 9/3231 713/161 |
| 2005/0097364 | A1* | 5/2005 | Edeki | G06F 21/31 726/4 |
| 2005/0283607 | A1* | 12/2005 | Zhang | H04L 63/062 713/170 |

(Continued)

OTHER PUBLICATIONS

Alina Hang; I Know What You Did Last Week! Do You? Dynamic Security Questions for Fallback Authentication on Smartphones; Chi 2015, Crossings, Seoul, Korea; p. 1383-1392.*

*Primary Examiner* — Monjour Rahim
(74) *Attorney, Agent, or Firm* — Patent Law Works LLP (57) ABSTRACT

Ongoing analytics streams are received over time from mobile computing devices. An analytics stream comprises data corresponding to monitored activity that occurred on the originating mobile computing device. Dynamic, personalized knowledge based authentication questions are generated from analytics stream data. In response to an authentication request from a user, the user is prompted to answer a given number of current dynamic, personalized knowledge based authentication questions.

21 Claims, 4 Drawing Sheets

(56) References Cited

U.S. PATENT DOCUMENTS

| | | | | |
|---|---|---|---|---|
| 2008/0155651 | A1* | 6/2008 | Wasmund | G06F 21/316 726/2 |
| 2008/0263643 | A1* | 10/2008 | Jaiswal | G06F 21/31 726/6 |
| 2012/0216260 | A1* | 8/2012 | Crawford | G06F 21/31 726/5 |
| 2013/0254834 | A1* | 9/2013 | King | H04L 63/107 726/1 |
| 2013/0318580 | A1* | 11/2013 | Gudlavenkatasiva | G06F 21/31 726/7 |
| 2014/0115712 | A1* | 4/2014 | Powell | G06F 21/6263 726/26 |
| 2014/0137219 | A1* | 5/2014 | Castro | H04L 67/02 726/6 |
| 2014/0283016 | A1* | 9/2014 | Sambamurthy | G06F 21/31 726/19 |
| 2015/0026796 | A1* | 1/2015 | Alan | G06F 21/31 726/19 |
| 2015/0341456 | A1* | 11/2015 | Chiu | H04L 67/26 709/219 |

* cited by examiner

USING PERSONAL COMPUTING DEVICE ANALYTICS AS A KNOWLEDGE BASED AUTHENTICATION SOURCE

TECHNICAL FIELD

This disclosure pertains generally to authentication of computer users, and more specifically to using personal computing device analytics as a knowledge based authentication source.

BACKGROUND

Authenticating users before allowing access to secure computer systems and websites is crucial. Online services such as banking, bill payment, social networking and e-commerce utilize ever increasing amounts of personal and financial user data online. Identity thieves and other malicious parties use a wide variety of techniques to attempt to gain unauthorized access to the accounts of innocent parties to commit financial fraud, obtain personal information and otherwise harm the interests of legitimate account owners and service providers. Properly authenticating users attempting to access online services and the like protects against such fraud, whereas insufficient authentication creates vulnerabilities.

Password authentication, in which the only authentication factor a user needs to provide is a password, is relatively weak. The types of passwords commonly utilized are fairly easy to crack, whereas strong passwords are difficult for users to remember and hence are rarely used at all, or else are written down in accessible locations. These problems are compounded by the number of separate password authenticated accounts most users need to maintain. For these reasons, many authentication systems extend password authentication schemes by requiring one or more additional factor(s) for added security. In multifactor authentication, the user must present multiple authentication factors of different types to access a service. For example, in two-factor authentication, a user must provide two factors, such as something the user knows (e.g., a password or PIN) and something the user has, which is referred to as a possession factor. Examples of possession factors include a onetime passcode generated by a registered personal smartphone, a hardware token generated random number, a onetime pad, a magnetic stripe card, etc. In general, multifactor authentication is much harder to crack than password only authentication.

Unfortunately the possession factor (the thing the user has) may be lost, misplaced, stolen, damaged or destroyed. Without the possession factor, users cannot connect to their authentication protected systems, in which case they lose access to their accounts and data. Some systems allow users to reset their possession factor credentials by answering challenge questions provided when the account was created (e.g., what is your mother's maiden name, zip code, city of birth, etc.). These are referred to as Knowledge Based Authentication (KBA) questions. However, the answers to conventional KBA questions can be guessed or learned by fraudulent parties relatively easily, for example by reviewing social networking sites and public records. Some systems attempt to validate users by automatically creating KBA questions based on the account the user tries to recover (e.g., when was the account created, whom do you email most often, etc.). As with KBA questions selected by users, system created KBA questions can generally be guessed based on publicly available information. Allowing users to reset their possession factor credentials through these insecure bypass mechanisms undermines the security benefit provided by the possession factor in the first place.

It would be desirable to address these issues.

SUMMARY

Ongoing analytics streams are received over time from mobile computing devices. An analytics stream comprises data corresponding to monitored activity that occurred on the originating mobile computing device. For example, such data can be derived from sources such as monitored sensor input, communication streams and application use that occurred on the originating mobile computing device over time. Dynamic, personalized knowledge based authentication questions are generated from analytics stream data. For example, dynamic, personalized knowledge based authentication questions can concern one or more physical locations of a user of an underlying mobile computing device, based on data in the corresponding analytics stream indicating the physical location of the user's mobile computing device over time. Another example subject for dynamic, personalized knowledge based authentication questions is the user's interaction with one or more third parties, based on communication protocol data in the received analytics stream indicating the physical proximity of the user's mobile computing device to additional device(s) registered to specific third parties. Dynamic, personalized knowledge based authentication questions can also cover purchases made by the user, based on data indicating payment activity that occurred on the mobile computing device. Other example topics for dynamic, personalized knowledge based authentication questions are audio and video content listened to, watched or created by the user over time. Another source for personalized questions is the usage history of other types of applications, for example based on which applications the user has been recently using, and at what time s/he was using them. Authentication questions can also address physical conditions (e.g., weather conditions, movement), based on data gleaned from sensors on the originating mobile computing device. Dynamic, personalized knowledge based authentication questions can be based on multiple data points in a received analytics stream, or data in a received analytics stream in combination with corresponding auxiliary information, such as mapping information.

In response to an authentication request from a user (e.g., a request to re-authenticate possession factor credentials), the user can be prompted to answer a given number of current dynamic, personalized knowledge based authentication questions. In one embodiment, the user is prompted to answer authentication questions based on data in the received analytics stream corresponding to monitored activity that occurred on the mobile computing device within a requisite period of time prior to the generation of the question(s). Where the mobile computing device is a possession factor device which the user reports lost or stolen, this period of time can exclude the most recent portion of the received analytics stream. It can be determined whether to authenticate the user (e.g., whether to reset the user's possession factor credentials) in response to whether the user correctly answers a requisite number of current dynamic, personalized knowledge based authentication questions.

In one embodiment, overlapping analytics streams are received over time from separate originating mobile communication devices. In this scenario, the overlapping of the separate received analytics streams results from communication having occurred between separate, corresponding originating mobile computing devices. For example, multiple trusted originating mobile computing devices may have been in physical proximity to each other, as detected by short-range communication (e.g., Bluetooth) between them. For an additional level of security, dynamic, personalized knowledge based authentication questions can be generated from data received in the overlapping analytics streams. For example, in the scenario in which the user has reported his or her possession factor mobile computing device lost or stolen and seeks to reset possession factor authentication credentials, dynamic, personalized knowledge based authentication questions can be generated from data that is both received in the analytics stream from the user's mobile computing device, and corroborated by data received in at least one overlapping analytics stream received from a separate mobile computing device.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
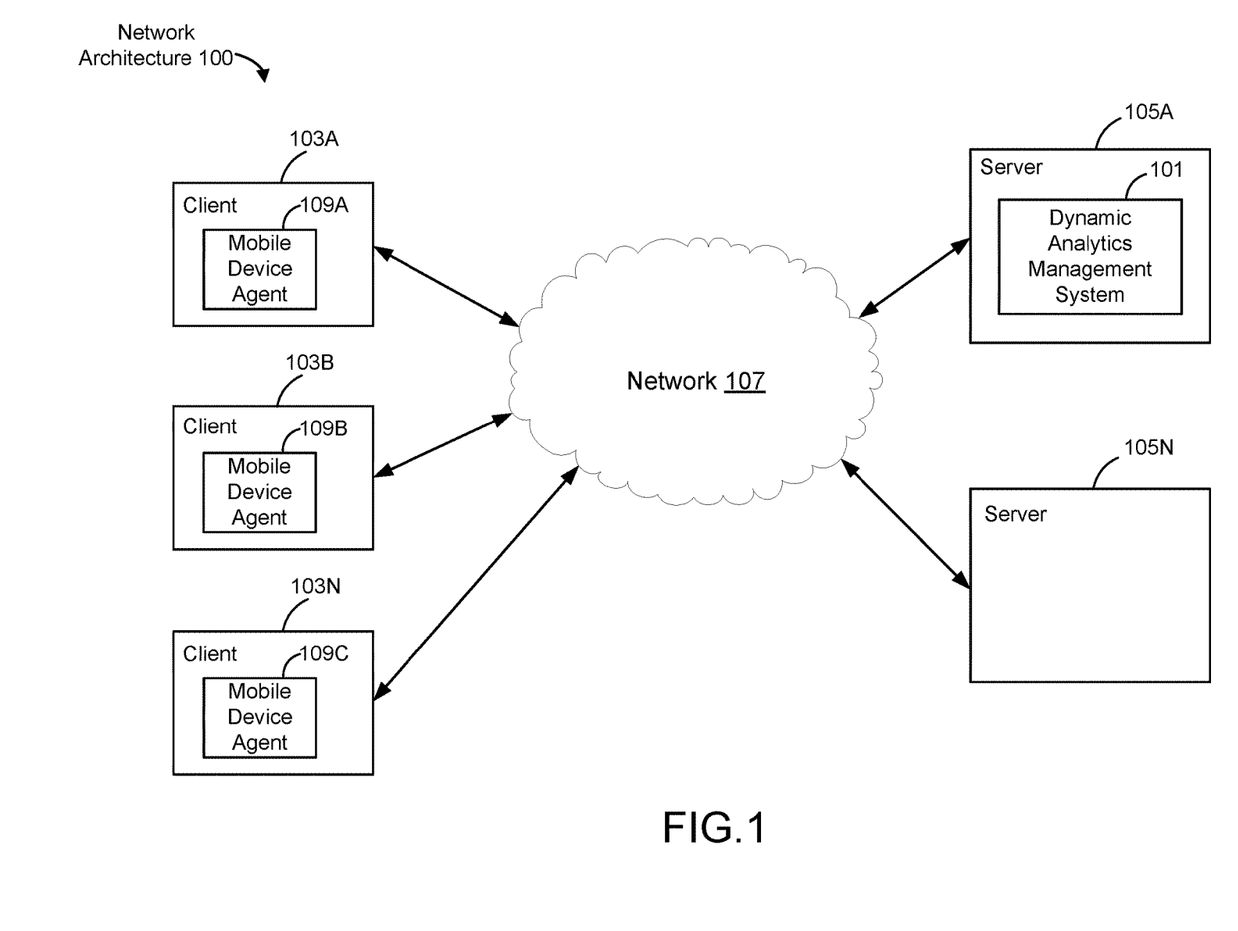
FIG. 1 is a block diagram of an exemplary network architecture in which a dynamic analytics management system can be implemented, according to some embodiments.

FIG. 1 is a block diagram illustrating an exemplary network architecture 100 in which a dynamic analytics management system 101 can be implemented. The illustrated network architecture 100 comprises multiple clients 103A, 103B and 103N, as well as multiple servers 105A and 105N. In FIG. 1, a dynamic analytics management system 101 is illustrated as residing on server 105A, with a mobile device agent 109 running on each client 103. It is to be understood that this is an example only, and in various embodiments various functionalities of this system 101 can be instantiated on a server 105, a client 103, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of mobile computing devices 301, which are portable computer systems 210 capable of connecting to a network 107 and running applications. Some mobile computing devices 301 are referred to as smartphones, although some mobile phones not so designated also have these capabilities. Tablet computers, laptop computers, hybrids, convertible laptops, smart watches and other types of wearable computing devices are all examples of mobile computing devices 301.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
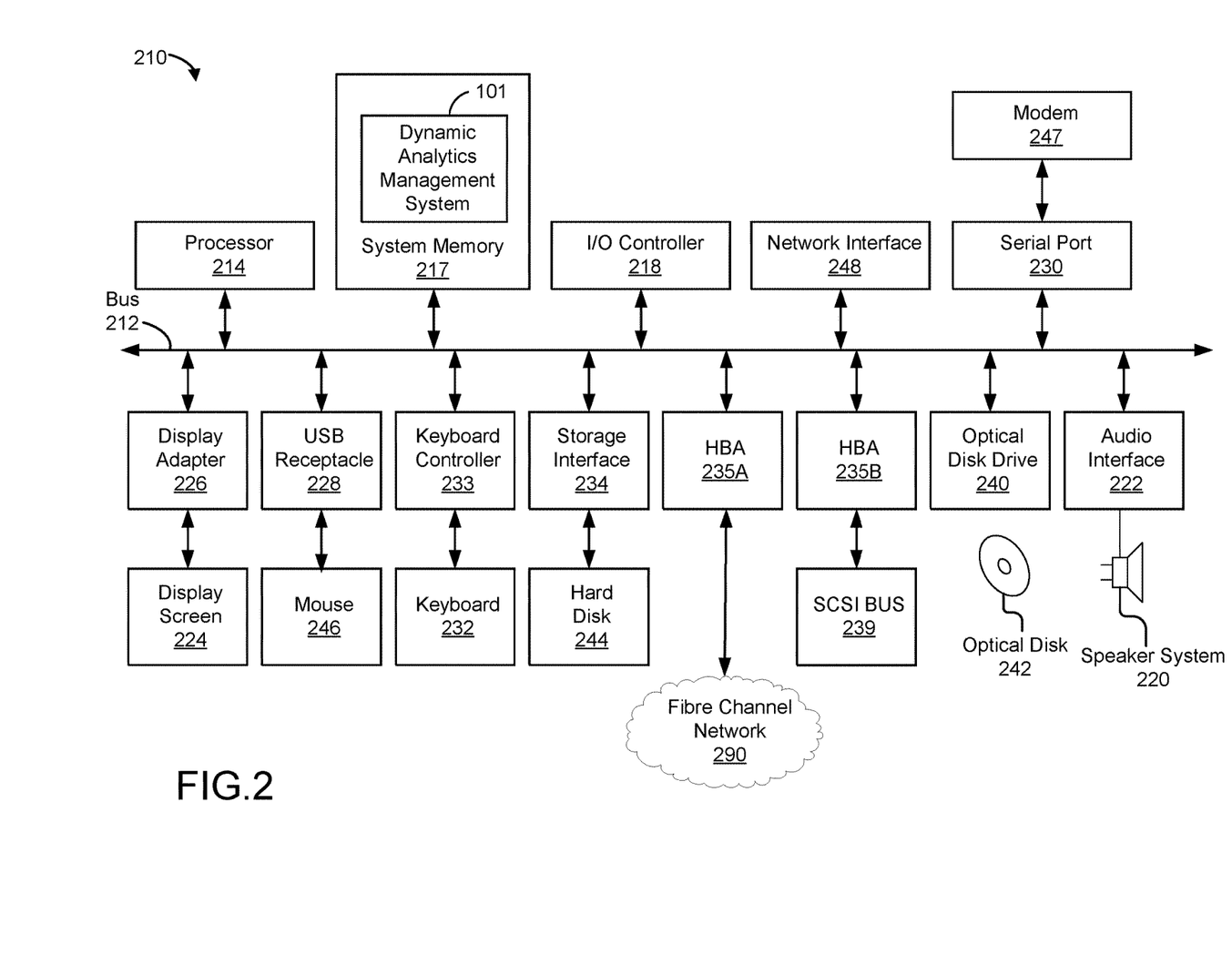
FIG. 2 is a block diagram of a computer system suitable for implementing a dynamic analytics management system, according to some embodiments.

FIG. 2 is a block diagram of a computer system 210 suitable for implementing a dynamic analytics management system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 301 via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242, flash memory) and loaded into system memory 217 and executed by the processor 214. Application programs can also be loaded into system memory 217 from a remote location (i.e., a remotely located computer system 210), for example via the network interface 248. In FIG. 2, the dynamic analytics management system 101 is illustrated as residing in system memory 217. The workings of the dynamic analytics management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
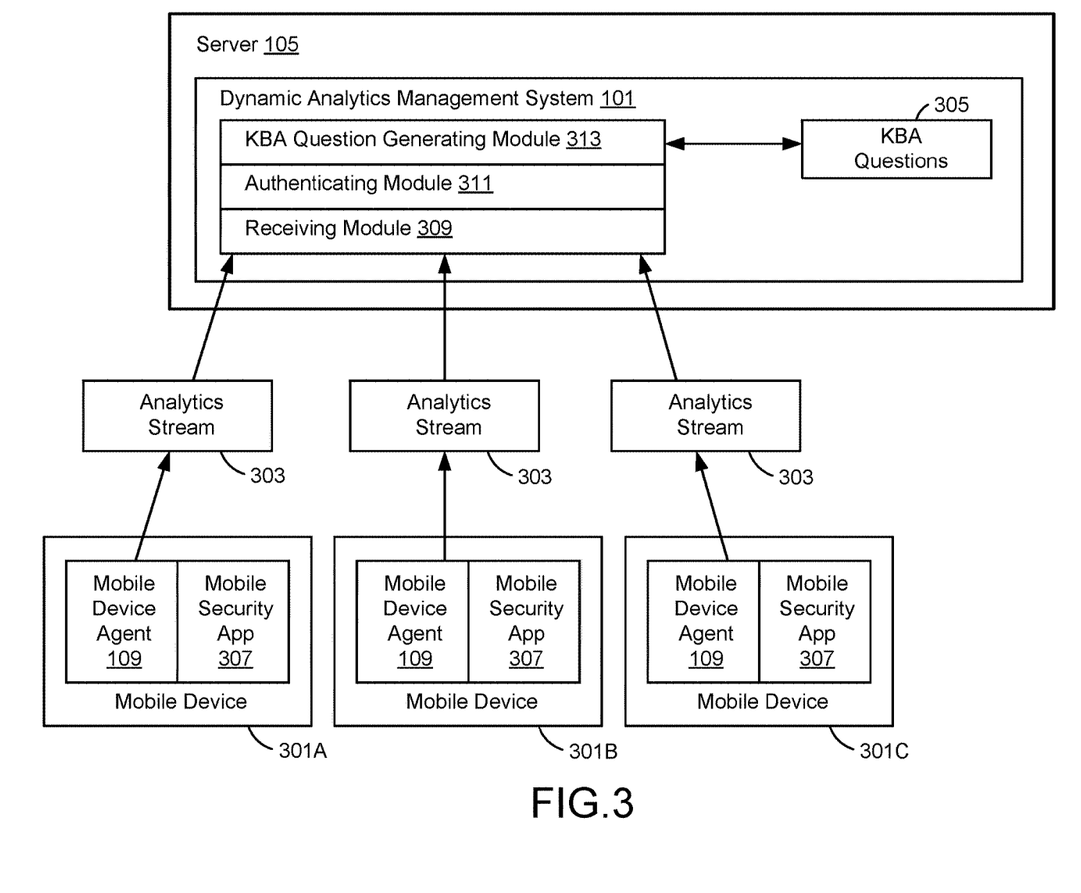
FIG. 3 is a block diagram of a dynamic analytics management system receiving analytics streams from multiple mobile computing devices, according to some embodiments.

FIG. 3 illustrates the operation of a dynamic analytics management system 101, according to some embodiments. As described above, the functionalities of the dynamic analytics management system 101 can reside on a server 105, a client 103, or be distributed between multiple computer systems 210, including within a cloud-based computing environment in which the functionality of the dynamic analytics management system 101 is provided as a service over a network 107. It is to be understood that although the dynamic analytics management system 101 is illustrated in FIG. 3 as a single entity, the illustrated dynamic analytics management system 101 represents a collection of functionalities, which can be instantiated as a single or multiple modules as desired (an instantiation of specific, multiple modules of the dynamic analytics management system 101 is illustrated in FIG. 3). It is to be understood that the modules of the dynamic analytics management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the dynamic analytics management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

FIG. 3 illustrates a dynamic analytics management system 101 communicating with three mobile computing devices 301, each of which is running a mobile device agent 109. Although FIG. 3 depicts only three mobile computing devices 301 for illustrative clarity, it is to be understood that in practice many more (or fewer) mobile computing devices 301 running mobile device agents 109 can interact with the dynamic analytics management system 101. As described in more detail below, in order to interact with the dynamic analytics management system 101, a specific mobile computing device 301 is registered therewith, and a mobile device agent 109 is installed on the registered mobile computing device 301. As illustrated in FIG. 3 and explained in detail below, the mobile device agent 109 on each mobile computing device 301 generates and transmits an analytics stream 303 to the dynamic analytics management system 101. The dynamic analytics management system 101 can then use the analytics stream 303 for generating dynamic, personalized KBA questions 305 to reset possession factor authentication credentials. Each mobile computing device 301 can be in the form of, for example, a smartphone, tablet, smartwatch, or other personal device carried or worn by an individual.

In some embodiments, some or all of these mobile computing devices 301 are configured to generate possession factor authentication credentials for multifactor authentication. For example, the second (possession) factor can be in the form of a number (often called a passcode) generated and displayed by, e.g., a mobile security app 307 or other software or hardware level component on the mobile device 301. The mobile security app 307 (or other component) derives the number through a cryptographic process, from a secret that is known only to itself and the authenticating component for the secured system (a shared secret) with which the mobile device 301 is registered. The secret is hashed or otherwise cryptographically combined with a dynamic challenge, resulting in the passcode which is displayed to the user. To access the secured system, in addition to providing the first factor (e.g., the password), the user enters the displayed passcode. The authenticating component also performs the same cryptographic process based on the shared secret and challenge, resulting in the matching passcode. Thus, the authenticating component is able to determine whether the user is in possession of the registered mobile computing device 301. Because the challenge is dynamic in nature and changes over time, the mobile security app 307 typically generates a different passcode each time the user is authenticated. In other embodiments, the second factor is generated by a standalone hardware token, or a hardware device that is coupled to the mobile device 301 (e.g., via USB). It is to be understood that although FIG. 3 illustrates the mobile security app 307 and the mobile device agent 119 as separate components, these entities can share functionalities and/or be combined in a single program provided by, e.g., a vendor of computer security software.

As noted above, in order to be utilized within the context of the dynamic analytics management system 101, a mobile computing device 301 is registered therewith, and a mobile device agent 109 is installed on the mobile computing device 301. In some embodiments, the dynamic analytics management system 101 operates as or in conjunction with the authentication system. In such a scenario, the registration of a mobile computing device 301 as a possession factor device and as a source for an analytics stream 303 can be one and the same. In other embodiments, these can be separate registrations processes. Additionally, the mobile device agent 109 can be in the form of functionality provided by an app running on the mobile phone (e.g., an iOS or Android app), which in turn can but need not be a more comprehensive mobile security app 307. The mobile device agent 109 can also be in the form of a driver (e.g., a driver installed on a mobile computing device running an OS such as Windows 10 or Android). It is to be understood that although the mobile device agent 109 is illustrated in FIG. 3 as a single entity, the mobile device agent 109 represents a collection of functionalities, which can be instantiated as a single or multiple modules as desired.

The mobile device agent 119 monitors activity that occurs on the mobile computing device 301 over time, and collects corresponding data which it uses to build an analytics stream 303. The mobile device agent 119 transmits the analytics stream 303 to the central dynamic analytics management system 101 (residing on, e.g., a cloud based server 105), where it can be used to generate dynamic, personalized KBA questions 305 as described in detail below. The specific data corresponding to monitored activity that the mobile device agent 119 gathers and includes in the analytics stream 303 can vary between embodiments, between mobile computing environments, and between users. In general, contemporary personal mobile computing devices 301 (e.g., phones, tablets, etc.) are equipped with cameras, GPS receivers, a wide range of sensors (e.g., accelerometers, gyro sensors, proximity sensors, barometers, light sensors, touch sensors, etc.), multiple communication protocols (e.g., LTE, Wi-Fi, Bluetooth, NFC, etc.) and are capable of running many different applications (e.g., financial services such as banking and bill payment, audio and video streaming, web browsing, video gaming, etc.). The mobile device agent 119 on each mobile computing device 301 can monitor sensor input, communication streams, and user activity such as application use over time, thus tracking not only the location of the mobile device 301 at different times, but data such as movement, direction, velocity, air pressure, temperature, illumination, the user's communication activities (e.g., texting, emailing, calling), proximity to other known registered mobile devices 301, financial activities (e.g., bill payment, online banking, purchases made with mobile payment applications), audio and video streaming, gaming activity, photographs and videos taken, etc. A mobile communication device 301 is a very rich source of user specific data that lends itself to creating dynamic, personalized KBA questions 305 as described below. Each mobile device agent 119 running on a mobile computing device 301 collects such data in real time, and transmits the collected data as an ongoing analytics stream 303 to the dynamic analytics management system 101. A receiving module 309 of the dynamic analytics management system 101 thus receives ongoing analytics streams 303 from multiple mobile computing devices 301 over time. Each analytics stream 303 consists of data corresponding to monitored activity that occurred on the originating mobile computing device 301.

Figure 4:
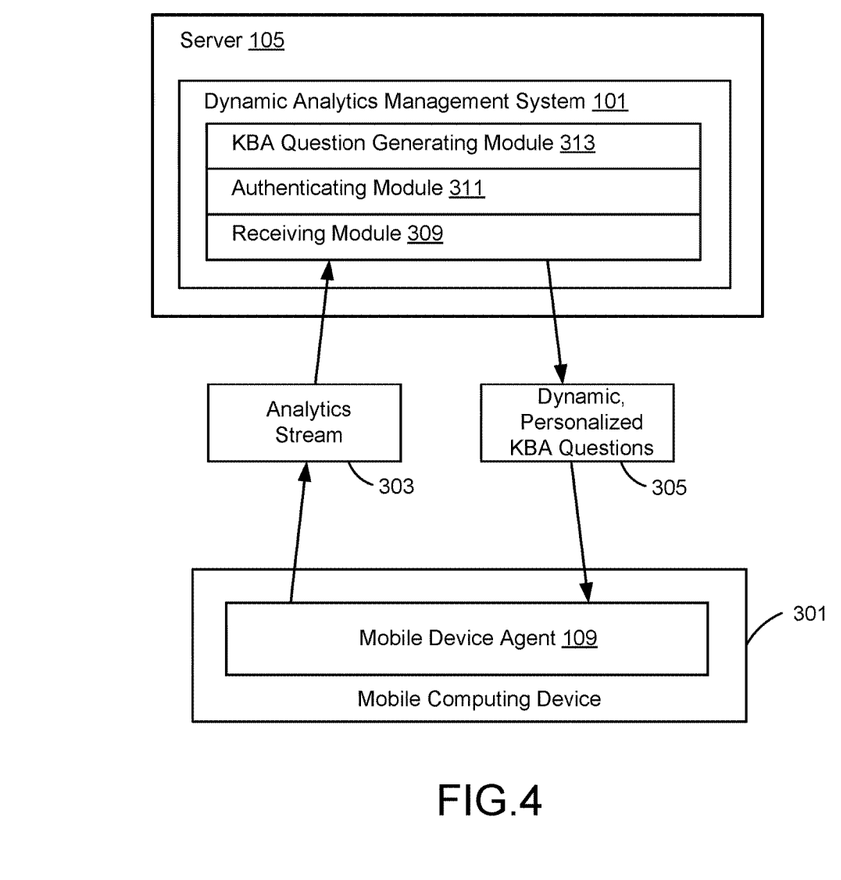
FIG. 4 is a block diagram of a dynamic analytics management system using personal computing device analytics as a knowledge based authentication source for resetting possession factor authentication credentials, according to some embodiments.

Turning now to FIG. 4, a dynamic analytics management system 101 is illustrated using personal device data received in an analytics stream 303 to create dynamic, personalized KBA questions 305 for authenticating a user (e.g., to reset a user's possession factor authentication credentials), according to some embodiments. More specifically, when a user's possession factor device (e.g., their smartphone or the like) is lost or stolen, the user cannot access their multifactor secured systems without resetting their credentials (e.g., authenticating themselves and registering a new possession factor device). To do so, the user can log in to an authenticating module 311 of the dynamic analytics management system 101 (e.g., from a new, non-registered mobile computing device 301, using a non-possession authentication factor associated with their registration, such as a password). The user indicates that s/he has lost or otherwise does not have access to the registered second factor device 301. The authenticating module 311 prompts the user to answer one or more current dynamic, personalized KBA questions 305 based on monitored activity that occurred on the mobile computing device. As described in more detail below, such dynamic, personalized KBA questions 305 are generated from the ongoing analytics stream 303 received from the user's mobile computing device 301. As the term is used herein, a "current" dynamic, personalized KBA question 305 refers to a dynamic, personalized KBA question 305 generated from data in the analytics stream 303 corresponding to monitored activity that occurred on the user's mobile computing device 301 within a requisite period of time prior to the generation of the question 305. The specific requisite period of time to use is a variable design parameter that can be adjusted up and down in different embodiments and under different circumstances. In general, current dynamic, personalized KBA questions 305 are based on activity that occurred relatively recently (e.g., within the last hour, day, week, month), as opposed to, for example, six months ago or last year.

More specifically, a KBA question generating module 313 of the dynamic analytics management system 101 generates current dynamic, personalized KBA questions 305 based on data in the analytics stream 303 corresponding to recent monitored activity on the user's mobile computing device 301. The user of the mobile device 301 should thus be able to answer the dynamic, personalized KBA questions 305, because they pertain to activity on the user's personal mobile device 301. Where the user no longer has the device 301, the analytics stream 303 received from the user's mobile computing device 301 prior to the time of loss/theft can be used to generate dynamic, personalized KBA questions 305, the answers to which should be known to the user. Because the personal mobile computing device 301 (e.g., smartphone or wearable device) is a rich source of varied information that keeps changing over time, as reflected in the corresponding analytics stream 303, it is difficult for a malicious party to guess or learn the answers to these dynamic, personalized questions 305.

In some embodiments, the KBA question generating module 313 can generate specific dynamic, personalized KBA questions 305 based on recent content of the analytics stream 303 in combination with corresponding auxiliary information, such as known mapping information concerning what is located at GPS coordinates gleaned from the stream 303, or notable events known to have occurred at given coordinates at specific times at which the mobile device 301 was located there. Some example dynamic, personalized KBA questions 305 could include "When was the last time you dined at a restaurant?" or "What was the last restaurant at which you ate?" In these examples, GPS coordinates (or other location identifying data) in the analytics stream 303 could be used to detect when the user's mobile device 301 was last located at the GPS coordinates of a given restaurant, for a period of time corresponding to eating a meal (e.g., half an hour, an hour, two hours). Of course, these are just examples to show that the GPS coordinates in the analytics stream 303 indicate where the user was at specific times, which can be used to generate location based dynamic, personalized KBA questions 305. More broadly, the KBA question generating module 313 can generate dynamic, personalized KBA questions 305 asking where the user was at given times, when the user was last at a certain location, type of location, or engaged in given activities identifiable by location (e.g., attended a particular type of sporting event, went to the movies, went bowling, etc.).

Another example of dynamic, personalized KBA question 305 generation is the use of Bluetooth (or other communication protocol) activity in the analytics stream 303 to detect the times at which mobile devices 301 registered to known third parties (e.g., the user's spouse, friends, children, colleagues, etc.) were proximate to the user's mobile device 301. Thus, the KBA question generating module 313 can generate specific dynamic, personalized KBA questions 305 asking the user when s/he last met with a given person, where they went, what they did, etc. Another type of dynamic, personalized KBA question 305 concerns the user's purchase history, such as what the user bought and/or how much the user paid for certain goods or services, as gleaned from mobile payment activity in the analytics stream 303. Examples could include "What were the last two movies you paid to stream?", "What were the last three items you ordered for home delivery?", "How much did you pay at the Thinking Cup on Hannover Street last Friday?" or "How much did you pay for the tickets to the last concert that you attended?"

The user's audio and video streaming history can be used to generate dynamic, personalized KBA questions 305 concerning the user's viewing/listening history (e.g., "What are the last three movies/shows/songs/podcasts you watched/listened to on your device?"). Photos and videos taken with the camera on the device 301 can be used to prompt the user to indicate which ones from a group s/he took (e.g., "Click on the specific photos of the 10 currently being displayed that you took"). Other content created by the user (e.g., audio recordings, drawings, etc.) using the mobile computing device 301 can be used to generate similar dynamic, personal questions 305. The usage history of other types of applications can also be used to generate dynamic, personal KBA questions 305, for example based on which applications the user has been recently using, and at what time s/he was using them. The user could also be asked questions about external weather or other physical conditions such as "When was the last time you were caught in the bad weather?" (the barometer could indicate rain, the light sensor could indicate an unusual drop in light consistent with a thunderstorm, etc.). The user can also be asked questions about exercise history such as "When did you last go jogging, and how far did you go?" (as indicated by the accelerometer and GPS, or by a fitness tracking app). In addition, multiple data points in the stream 303 can be used to create a single question, such as "What special event did you see during your walk on Thursday?" (for example, the accelerometer and GPS could indicate that the user was walking through a specific city park where a one-time theatrical presentation was taking place).

It is to be understood that the specific dynamic, personalized KBA questions 303 (and types thereof) described above are just examples. In different embodiments, a wide variety of dynamic, personalized KBA questions 305 can be generated at any desired level of granularity from the varied data present in the analytics stream 303 originating from a given mobile computing device 301. Because the mobile computing device 301 is carried or worn by the specific user, data that is personal to the user is gleaned on the device 301 by the mobile device agent 109 and used to build the analytics stream 303. Because new data is continuously being generated on the mobile computing device 301, gleaned by the mobile device agent 109 and streamed to the dynamic analytics management system 101, the analytics stream 305 is dynamic in nature. Thus, the KBA question generating module 313 can generate current KBA questions 305 based on the dynamic analytics stream 303 which consists of data personally associated with the activities of the user—in other words, current dynamic, personalized KBA questions 305.

In some embodiments the KBA question generating module 313 generates current dynamic, personalized KBA questions 305 in real time when a specific user attempts to authenticate, whereas in other embodiments the KBA question generating module 313 continually generates dynamic, personalized KBA questions 305 as analytics streams 303 are received from the mobile computing device 301. In either case, when a specific user attempts to authenticate, the authenticating module 311 can prompt the user to answer a given number of current dynamic, personalized KBA questions 305 generated from the analytics stream 303 corresponding to the user's mobile computing device 301. The number and difficulty of dynamic, personalized KBA questions 305 to ask the user can vary between embodiments, as can the number of wrong answer to allow before locking out the user (e.g., require correct answers to two consecutive questions, require three correct answers in five total tries, etc.). Since a certain amount of time may have transpired between the loss of the mobile computing device 301 and the attempt to re-authenticate, the authenticating module 311 can account for such a delay when asking the user dynamic, personalized KBA questions 305. For example, the user can be prompted to answer dynamic, personalized questions 305 that do not take into account the portion of the analytics stream 301 received most recently (e.g., during the last 48 hours). In other words, in some embodiments the requisite period of prior time to use to generate current KBA questions 305 excludes a most recent portion of the received analytics stream 301. What specific time window to utilize to formulate dynamic, personalized KBA questions 305 from the analytics stream 303 can vary between embodiments. In some embodiments, the authenticating module 311 is more tolerant of wrong answers to questions 305 based on data gleaned during a more recent period of time during which the user might not have had possession of the mobile computing device 301. In some embodiments, the user is prompted to enter when s/he lost mobile computing device 301. Different embodiments allow re-authentication for different lengths of time after the loss of the device 301 (e.g., within one day, three days, one week, etc.).

If the user successfully answers the requisite number of dynamic, personalized KBA questions 305 within a requisite amount of time, the dynamic analytics management system 101 re-authenticates the user's possession factor credentials (e.g., by registering the new mobile computing device 301 as the user's possession device). If the user is not able to successfully answer the requisite number of dynamic, personalized KBA questions 305, the dynamic analytics management system 101 can take additional action as desired (e.g., freeze the user's account, contact the user through a secure channel not associated with the lost mobile computing device 301, etc.). The above described embodiments concern using dynamic, personalized KBA questions 305 to re-authenticate a user's possession factor credentials. It is to be understood that in other embodiments, dynamic, personalized KBA questions 305 can be used to authenticate users under other circumstances. Because current dynamic, personalized KBA questions 305 should be answerable to the user of the mobile computing device 301 from which the underlying analytics stream 303 originated but are difficult for third parties to guess, dynamic, personalized KBA questions 305 are a secure authentication factor. As such, dynamic, personalized KBA questions 305 can be used in other contexts, such as, for example, to re-authenticate a user who has forgotten a knowledge based authentication factor ("something you know") such as a password, or as a primary or secondary knowledge based authentication factor in and of themselves.

In one embodiment, an additional level of security is added by using analytics streams 303 from a group of registered mobile computing devices 301 to create dynamic, personalized KBA questions 305. This enables creation of dynamic, personalized KBA questions 305 based on authentication data gleaned from the mobile computing devices 301 of a group of trusted users, thereby protecting against the case in which the analytics stream 303 of the user attempting to re-authenticate has potentially been compromised. For example, where the missing device 301 has been stolen or found by a malicious party, the malicious party might attempt to use the mobile computing device 301 over a period of time to construct an analytics stream 303 of "forged" activity, to be used to attempt to re-authenticate the user's possession factor credentials fraudulently. By constructing dynamic, personalized KBA questions 305 from overlapping analytics streams 303, the dynamic analytics management system 101 can protect against such malicious activity.

More specifically, overlapping analytics streams 303 of a group of trusted users can be used to generate dynamic, personalized KBA questions 305 that could be answered by any or most members of the trusted group. Such overlaps in the analytics streams 303 occur where multiple users interact in physical proximity to one another (as detected by short-range communication between one another's mobile computing devices 301, and/or by corresponding location identifying data such as GPS coordinates), and as the users electronically communicate with one another using their mobile computing devices 301, e.g., text messaging, email, voice calls, etc. This enables the dynamic analytics management system 101 to reconstruct portions of the analytics stream 303 of the non-trusted (i.e., missing) mobile computing device 301, based on overlapping segments of the analytics streams 303 received from the trusted mobile devices 301 of other users in the group. For example, data in the analytics stream 303 of the missing mobile computing device 301 that cannot be confirmed by at least one overlapping stream could have been engineered by a malicious party that is in physical possession of the missing device 301. Thus, in some embodiments such uncorroborated data is not used to generate dynamic, personalized KBA questions 305. On the other hand, information in the analytics stream 303 of the missing device 301 that is corroborated by the analytics stream 303 of at least one other member of the trusted group can be considered secure. The composition of the groups, when to use corroborated analytics stream 303 data to generate dynamic, personalized KBA questions 305, the amount of corroboration required, and other similar factors are variable design parameters that can vary between embodiments as desired.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for using personal mobile computing device analytics as a knowledge based authentication source, the method comprising the steps of:
   receiving an ongoing analytics stream over time from a mobile computing device, by a computer implemented dynamic analytics management system, the ongoing analytics stream comprising data corresponding to monitored activity that occurred on the mobile computing device;
   generating dynamic, personalized knowledge based authentication questions from data in the received analytics stream, the data corresponding to monitored activity that occurred on the mobile computing device;
   prompting a user to answer at least one current dynamic, personalized knowledge based authentication question generated from data in the received analytics stream; and
   determining whether to authenticate the user responsive to whether the user correctly answers a requisite number of current dynamic, personalized knowledge based authentication questions generated from data in the received analytics stream.

2. The method of claim 1 wherein receiving an ongoing analytics stream over time from a mobile computing device further comprises:
   receiving an analytics stream comprising data corresponding to monitored sensor input, communication streams, and application use that occurred on the mobile computing device over time.

3. The method of claim 1 wherein generating dynamic, personalized knowledge based authentication questions from data in the received analytics stream further comprises:
   generating at least one dynamic, personalized knowledge based authentication question concerning at least one physical location of the user, based on data in the received analytics stream indicating the mobile computing device's physical location over time.

4. The method of claim 1 wherein generating dynamic, personalized knowledge based authentication questions from data in the received analytics stream further comprises:
   generating at least one dynamic, personalized knowledge based authentication question concerning the user's interaction with at least one specific third party, based on communication protocol data in the received analytics stream indicating physical proximity of the mobile computing device to at least one additional device registered to the at least one specific third party.

5. The method of claim 1 wherein generating dynamic, personalized knowledge based authentication questions from data in the received analytics stream further comprises:
   generating at least one dynamic, personalized knowledge based authentication question concerning at least one purchase made by the user, based on data in the received analytics stream indicating payment activity that occurred on the mobile computing device over time.

6. The method of claim 1 wherein generating dynamic, personalized knowledge based authentication questions from data in the received analytics stream further comprises:
   generating at least one dynamic, personalized knowledge based authentication question concerning audio and/or video content consumed by the user, based on data in the received analytics stream indicating content streamed to the mobile computing device over time.

7. The method of claim 1 wherein generating dynamic, personalized knowledge based authentication questions from data in the received analytics stream further comprises:
generating at least one dynamic, personalized knowledge based authentication question concerning audio and/or video content created by the user, based on data in the received analytics stream indicating content created on the mobile computing device over time.

8. The method of claim 1 wherein generating dynamic, personalized knowledge based authentication questions from data in the received analytics stream further comprises:
generating at least one dynamic, personalized knowledge based authentication question concerning external physical conditions, based on data in the received analytics stream gleaned from sensors on the mobile computing device.

9. The method of claim 1 wherein generating dynamic, personalized knowledge based authentication questions from data in the received analytics stream further comprises:
generating at least one dynamic, personalized knowledge based authentication question based on multiple data points in the received analytics stream.

10. The method of claim 1 wherein generating dynamic, personalized knowledge based authentication questions from data in the received analytics stream further comprises:
generating at least one dynamic, personalized knowledge based authentication question based on data in the received analytics stream in combination with corresponding auxiliary information.

11. The method of claim 1 wherein generating dynamic, personalized knowledge based authentication questions from data in the received analytics stream further comprises:
generating at least one dynamic, personalized knowledge based authentication question concerning at least one application used on the mobile computing device and a time at which it was used, based on data in the received analytics stream indicative of application usage history.

12. The method of claim 1 further comprising:
generating at least one current dynamic, personalized knowledge based authentication question in real time, responsive to an attempt by the user to authenticate; and
prompting the user to answer the at least one generated current dynamic, personalized knowledge based authentication question.

13. The method of claim 1 further wherein prompting a user to answer a current dynamic, personalized knowledge based authentication question generated from data in the received analytics stream further comprises:
prompting the user to answer a dynamic, personalized knowledge based authentication question generated from data in the received analytics stream corresponding to monitored activity that occurred on the mobile computing device within a requisite period of time prior to generation of the dynamic, personalized knowledge based authentication question.

14. The method of claim 1 further wherein prompting a user to answer a current dynamic, personalized knowledge based authentication question generated from data in the received analytics stream further comprises:
prompting the user to answer a dynamic, personalized knowledge based authentication question generated from data in the received analytics stream corresponding to monitored activity that occurred on the mobile computing device within a requisite period of time prior to generation of the dynamic, personalized knowledge based authentication question, wherein the requisite period of time excludes a most recent portion of the received analytics stream.

15. The method of claim 1 wherein:
the mobile computing device further comprises a possession factor device registered to the user.

16. The method of claim 1 further wherein determining whether to authenticate the user further comprises:
determining whether to reset possession factor authentication credentials for the user.

17. The method of claim 1 further wherein determining whether to authenticate the user further comprises:
authenticating the user responsive to the user correctly answering the requisite number of current dynamic, personalized knowledge based authentication questions.

18. A computer implemented method for using personal mobile computing device analytics as a knowledge based authentication source, the method comprising the steps of:
receiving a plurality of overlapping analytics streams over time, by a computer implemented dynamic analytics management system, each specific one of the plurality of received overlapping analytics streams comprising data corresponding to monitored activity that occurred on a separate originating mobile computing device, wherein the overlapping of separate ones of the received analytics streams results from communication having occurred between separate, corresponding originating mobile computing devices;
generating dynamic, personalized knowledge based authentication questions from data received in overlapping analytics streams, the data corresponding to monitored activity that occurred on corresponding originating mobile computing devices;
prompting a user of a specific one of the originating mobile computing devices to answer at least one current dynamic, personalized knowledge based authentication question generated from data received in overlapping analytics streams; and
determining whether to authenticate the user responsive to whether the user correctly answers a requisite number of current dynamic, personalized knowledge based authentication questions generated from data received in overlapping analytics streams.

19. The method of claim 18 further wherein determining whether to authenticate the user further comprises:
determining whether to reset possession factor authentication credentials for the user, responsive to receiving an indication of the user's originating mobile computing device having been lost or stolen;
generating dynamic, personalized knowledge based authentication questions from data that is both received in an analytics stream from the user's originating mobile computing device, and corroborated by data received in at least one overlapping analytics stream received from a separate mobile computing device; and
authenticating the user responsive to the user correctly answering the requisite number of current dynamic, personalized knowledge based authentication questions.

20. The method of claim 18 wherein communication having occurred between separate, corresponding originating mobile computing devices further comprises:
multiple trusted originating mobile computing devices having been in physical proximity, as detected by short-range communication between the multiple trusted originating mobile computing devices.

21. At least one non-transitory computer readable-storage medium for using personal mobile computing device analytics as a knowledge based authentication source, the at least one non-transitory computer readable-storage medium storing computer executable instructions that, when loaded into computer memory and executed by at least one processor of a computing device, cause the computing device to perform the following steps
- receiving an ongoing analytics stream over time from a mobile computing device, by a computer implemented dynamic analytics management system, the ongoing analytics stream comprising data corresponding to monitored activity that occurred on the mobile computing device;
- generating dynamic, personalized knowledge based authentication questions from data in the received analytics stream, the data corresponding to monitored activity that occurred on the mobile computing device;
- prompting a user to answer at least one current dynamic, personalized knowledge based authentication question generated from data in the received analytics stream; and
- determining whether to authenticate the user responsive to whether the user correctly answers a requisite number of current dynamic, personalized knowledge based authentication questions generated from data in the received analytics stream.

* * * * *